United States Patent [19]

Radkowsky et al.

[11] 4,123,328
[45] Oct. 31, 1978

[54] UTILIZATION OF HEAVY ELEMENTS IN THERMAL AND EPITHERMAL REACTORS

[75] Inventors: Alvin Radkowsky, Elizabeth, N.J.; Ji-Peng Chien, Tao Yuan, Taiwan; Chao-Yie Yang, Tao Yuan, Taiwan; Horng-Ming Hsieh, Tao Yuan, Taiwan

[73] Assignee: Institute of Nuclear Energy Research, Atomic Energy Council, Taiwan

[21] Appl. No.: 723,482

[22] Filed: Sep. 15, 1976

[51] Int. Cl.² ............................................. G21C 1/04
[52] U.S. Cl. .................................... 176/78; 176/92 R
[58] Field of Search ...................... 176/17, 18, 20, 40, 176/76, 78, 86, 92

[56] References Cited

U.S. PATENT DOCUMENTS

| | | | |
|---|---|---|---|
| 2,830,944 | 4/1958 | Wigner et al. | 176/86 R |
| 2,832,733 | 4/1958 | Szilard | 176/86 M |
| 2,837,477 | 6/1958 | Fermi et al. | 176/86 L |
| 3,048,534 | 8/1962 | Tonks | 176/86 R |
| 3,146,172 | 8/1964 | Bauer | 176/92 R |
| 3,255,083 | 6/1966 | Klahr | 176/40 |
| 3,261,755 | 7/1966 | Mostert | 176/86 R |
| 3,351,532 | 11/1967 | Raab, Jr. et al. | 176/17 |
| 3,519,535 | 7/1970 | French et al. | 176/86 R |
| 3,523,869 | 8/1970 | Hilborn | 176/86 R |
| 3,849,248 | 11/1974 | Channon et al. | 176/86 R |

FOREIGN PATENT DOCUMENTS

948,909  2/1964  United Kingdom ............... 176/92 R

Primary Examiner—Samuel W. Engle
Assistant Examiner—S. A. Cangialosi
Attorney, Agent, or Firm—Burns, Doane, Swecker & Mathis

[57] ABSTRACT

Increases in reactivity can be obtained in thermal and epithermal reactors by utilization of heavy elements in selected locations in the reactors. These increases can result in economic gains, for example, in reduction in the amounts of heavy water needed in heavy water moderated reactors and in reduction of the enrichment needed in light water reactors. A number of examples are provided of advantageous use of the heavy elements in specific reactor embodiments.

28 Claims, 10 Drawing Figures

$R_o = 0.2776$ cm
$R_1 = 0.760$ cm
$OA = 1.1646$ cm
$OP = 1.751$ cm
$OB = 2.6615$ cm
$OQ = 3.281$ cm
$OC = 4.360$ cm
$OD = 5.200$ cm
$OE = 5.708$ cm
$OF = 6.550$ cm
$OG = 6.705$ cm

Square lattice pitch = 28.58 cm

$R_1 = 2.689$ cm
$P = 12.692$ cm ($2 \times 6.346$, See P.19)

— Smeared PWR Module
— Heavy element

UTILIZATION OF HEAVY ELEMENTS IN THERMAL AND EPITHERMAL REACTORS

DETAILED SPECIFICATION AND DESCRIPTION OF THE INVENTION

1. Field of the Invention

The invention described herein relates generally to nuclear reactors and more particularly to thermal and epithermal reactors as defined below.

2. Description of the Prior Art

U.S. Pat. No. 2,708,656 issued to E. Fermi et al. on May 17, 1955 describes physics principles applicable to nuclear reactors. U.S. Pat. No. 2,832,733 issued to L. Szilard on Apr. 29, 1958 describes physics principles applicable to heavy water moderated reactors. "Nuclear Reactor Engineering," by Samuel Glasstone and Alexander Sesonske, prepared under the auspices of the Division of Technical Information, U.S. Atomic Energy Commission, Van Nostrand Reinhold Company (1967), describes general terminology used in this specification. The "Nuclear Engineering Handbood." edited by H. Etherington, first Edition, McGraw-Hill Book Company (1967) describes the mechanical design and operation of Reactors.

For clarity and precision, specific terminology used in this specification is defined as follows:

Active Core: The central portion of a nuclear reactor which contains fissile and fertile material and in which the fission chain is sustained and most of the energy of fission is released as heat.

Blanket Region: An active core region immediately surrounding the seed region containing predominantly fertile material and characterized by conversion of the fertile material into fissile material by neutron capture.

Calandria: Tube containing fuel elements and coolant with tube wall serving the purpose of separating the coolant from the moderator. Particularly applicable to reactors of the CAN-DU type.

Epithermal Reactor: A nuclear reactor characterized by a neutron energy spectrum in which more than half of the fissions result from the absorption of neutrons having energies above 0.6 electron volts (0.6 ev) and a moderating power per fissile atom ($\xi Z_s/NU$) less than 1000.

Fertile Material: Material which can be converted into fissile material through neutron capture; for example thorium-232 and uranium-238 fertile materials are converted respectively to uranium-233 and plutonium-239 fissile material.

Fissile Material: Material which will undergo fissions with neutrons of all energies; including thermal to fast neutrons; for example uranium-233, uranium-235 and plutonium-239.

Fuel: Designates either fissile or fertile material or a combination of both.

Heavy water: Deuterium oxide, usually containing no more than 0.25% light water.

Heavy Elements: These are elements of high atomic weight, such as lead or bismuth, characterized by high elastic and inelastic cross sections for high energy neutrons (above 1 MEV) and low capture cross sections.

Moderator: Materials which are used to slow down and moderate the fission neutrons. In light water reactors the moderator and coolant are often identical, but in heavy water they are usually separated (See calandria above).

Module: One of a plurality of fuel units comprising an active core region.

Module Geometry: The geometrical configuration of a nuclear reactor having modules dependently nuclearly coupled to form an active core.

Reflector: Region without fuel surrounding the active core region.

Seed Region: An active core region containing substantial fissile material and characterized by neutron leakage to a blanket region.

Thermal Reactor: A nuclear reactor characterized by a neutron spectrum in which more than half of the fissions result from the absorption of neutrons having a substantially Maxwellian number-energy distribution about an energy value equal to KT, where K is a constant and T is the reactor temperature in degrees Kelvin and a moderating power per fissile atom ($\xi Z_s/NU$) greater than 1,000. In such a reactor, more than half of the fissions result from the absorption of neutrons having neutron energies below 0.6 electron volts (0.6 ev).

The principle of this invention is to utilize heavy elements, as defined above, to replace or supplement the moderator at specific locations in the reactor in order to obtain reactivity increases. Such reactivity increases are achievable because the heavy elements have in certain energy regions cross sections which are more advantageous nuclearly for thermal end epithermal reactors than those of the moderators in general use. Specifically in the very high energy regions the heavy elements have much higher elastic and inelastic scattering cross sections with much greater degradation of the neutron energy, and have low capture cross sections.

The situation as regards the nuclear data can be understood by examination of the following tables taken from GROUP CONSTANTS FOR NUCLEAR REACTOR CALCULATIONS by Professor I. I. Bondarenko. (These tables are cited here only to illustrate the bases for this invention. The actual cross sections used for the embodiments described herein were, except as noted, the latest ENDF-B data available).

TABLES OF GROUP CONSTANTS
Hydrogen (H)

| i | $E_n$ | | $\Delta u$ | $\sigma_t$ | $\sigma_c$ | $\sigma_{in}$ | $\sigma_e$ | $\mu_e$ | $\xi$ | $\sigma_d(e)$ |
|---|---|---|---|---|---|---|---|---|---|---|
| 1  | 6,5–10,5    | MeV | 0,48 | 1,20 | 0,000 | 0,00 | 1,20 | 0,667 | 1,00 | 1,01 |
| 2  | 4,0–6,5     | MeV | 0,48 | 1,65 | 0,000 | —    | 1,65 | 0,667 | 1,00 | 1,36 |
| 3  | 2,5–4,0     | MeV | 0,48 | 2,20 | 0,000 | —    | 2,20 | 0,667 | 1,00 | 1,74 |
| 4  | 1,4–2,5     | MeV | 0,57 | 3,00 | 0,000 | —    | 3,00 | 0,667 | 1,00 | 2,28 |
| 5  | 0,8–1,4     | MeV | 0,57 | 4,10 | 0,000 | —    | 4,10 | 0,667 | 1,00 | 3,12 |
| 6  | 0,4–0,8     | MeV | 0,69 | 5,70 | 0,000 | —    | 5,70 | 0,667 | 1,00 | 4,13 |
| 7  | 0,2–0,4     | MeV | 0,69 | 8,10 | 0,000 | —    | 8,10 | 0,667 | 1,00 | 5,87 |
| 8  | 0,1–0,2     | MeV | 0,69 | 11,0 | 0,000 | —    | 11,0 | 0,667 | 1,00 | 7,97 |
| 9  | 46,5–100    | keV | 0,77 | 14,0 | 0,000 | —    | 14,0 | 0,667 | 1,00 | 9,77 |
| 10 | 21,5–46,5   | keV | 0,77 | 16,6 | 0,000 | —    | 16,6 | 0,667 | 1,00 | 11,6 |
| 11 | 10,0–21,5   | keV | 0,77 | 18,5 | 0,000 | —    | 18,5 | 0,667 | 1,00 | 12,9 |
| 12 | 4,65–10,0   | keV | 0,77 | 19,3 | 0,000 | —    | 19,3 | 0,667 | 1,00 | 13,5 |
| 13 | 2,15–4,65   | keV | 0,77 | 19,7 | 0,001 | —    | 19,7 | 0,667 | 1,00 | 13,8 |
| 14 | 1,0–2,15    | keV | 0,77 | 20,0 | 0,001 | —    | 20,0 | 0,667 | 1,00 | 14,0 |
| 15 | 465–1000    | eV  | 0,77 | 20,1 | 0,002 | —    | 20,1 | 0,667 | 1,00 | 14,0 |
| 16 | 215–465     | eV  | 0,77 | 20,2 | 0,003 | —    | 20,2 | 0,667 | 1,00 | 14,1 |
| 17 | 100–215     | eV  | 0,77 | 20,2 | 0,004 | —    | 20,2 | 0,667 | 1,00 | 14,1 |
| 18 | 46,5–100    | eV  | 0,77 | 20,3 | 0,006 | —    | 20,3 | 0,667 | 1,00 | 14,2 |
| 19 | 21,5–46,5   | eV  | 0,77 | 20,3 | 0,009 | —    | 20,3 | 0,667 | 1,00 | 14,1 |
| 20 | 10,0–21,5   | eV  | 0,77 | 20,3 | 0,014 | —    | 20,3 | 0,667 | 1,00 | 14,2 |
| 21 | 4,65–10     | eV  | 0,77 | 20,3 | 0,020 | —    | 20,3 | 0,667 | 1,00 | 14,2 |
| 22 | 2,15–4,65   | eV  | 0,77 | 20,3 | 0,030 | —    | 20,3 | 0,667 | 1,00 | 14,2 |
| 23 | 1,0–2,15    | eV  | 0,77 | 20,3 | 0,044 | —    | 20,3 | 0,667 | 1,00 | 14,2 |
| 24 | 0,465–1,0   | eV  | 0,77 | 20,4 | 0,064 | —    | 20,3 | 0,667 | 1,00 | 14,2 |
| 25 | 0,215–0,465 | eV  | 0,77 | 20,4 | 0,093 | —    | 20,3 | 0,667 | 1,00 | 14,2 |
| T  | 0,0252      | eV  |      | 20,6 | 0,332 | —    | 20,3 | 0,667 | —    | —    |

| | $\sigma_e(i,i+k)$ at k equal to | | | | | | | | | | |
|---|---|---|---|---|---|---|---|---|---|---|---|
| i | 0 | 1 | 2 | 3 | 4 | 5 | 6 | 7 | 8 | 9 | 10 |
| 1  | 0,160 | 0,400  | 0,240 | 0,176 | 0,096 | 0,064 | 0,032 | 0,016 | 0,009 | 0,004 | 0,003 |
| 2  | 0,287 | 0,512  | 0,375 | 0,205 | 0,136 | 0,068 | 0,034 | 0,018 | 0,008 | 0,004 | 0,003 |
| 3  | 0,457 | 0,767  | 0,418 | 0,279 | 0,139 | 0,070 | 0,037 | 0,018 | 0,009 | 0,004 | 0,002 |
| 4  | 0,725 | 0,975  | 0,650 | 0,325 | 0,163 | 0,087 | 0,040 | 0,019 | 0,009 | 0,004 | 0,003 |
| 5  | 0,984 | 1,558  | 0,779 | 0,389 | 0,209 | 0,097 | 0,045 | 0,021 | 0,010 | 0,004 | 0,004 |
| 6  | 1,570 | 2,065  | 1,033 | 0,553 | 0,257 | 0,119 | 0,055 | 0,026 | 0,012 | 0,006 | 0,004 |
| 7  | 2,231 | 2,936  | 1,573 | 0,732 | 0,338 | 0,157 | 0,073 | 0,034 | 0,016 | 0,007 | 0,004 |
| 8  | 3,029 | 4,270  | 1,984 | 0,919 | 0,427 | 0,199 | 0,092 | 0,043 | 0,020 | 0,009 | 0,008 |
| 9  | 4,227 | 5,238  | 2,430 | 1,128 | 0,524 | 0,243 | 0,113 | 0,052 | 0,024 | 0,011 | 0,010 |
| 10 | 5,012 | 6,210  | 2,882 | 1,338 | 0,621 | 0,288 | 0,134 | 0,062 | 0,029 | 0,013 | 0,011 |
| 11 | 5,585 | 6,921  | 3,212 | 1,491 | 0,692 | 0,321 | 0,449 | 0,069 | 0,032 | 0,015 | 0,013 |
| 12 | 5,827 | 7,220  | 3,350 | 1,556 | 0,722 | 0,335 | 0,156 | 0,072 | 0,033 | 0,016 | 0,013 |
| 13 | 5,947 | 7,369  | 3,420 | 1,588 | 0,737 | 0,342 | 0,159 | 0,074 | 0,034 | 0,016 | 0,014 |
| 14 | 6,038 | 7,482  | 3,472 | 1,612 | 0,748 | 0,347 | 0,161 | 0,075 | 0,035 | 0,016 | 0,014 |
| 15 | 6,068 | 7,520  | 3,489 | 1,620 | 0,752 | 0,349 | 0,162 | 0,075 | 0,035 | 0,016 | 0,014 |
| 16 | 6,098 | 7,557  | 3,506 | 1,628 | 0,756 | 0,351 | 0,163 | 0,076 | 0,035 | 0,016 | 0,014 |
| 17 | 6,098 | 7,557  | 3,506 | 1,628 | 0,756 | 0,351 | 0,163 | 0,076 | 0,035 | 0,030 | —     |
| 18 | 6,129 | 7,594  | 3,524 | 1,636 | 0,759 | 0,352 | 0,164 | 0,076 | 0,066 | —     | —     |
| 19 | 6,129 | 7,594  | 3,524 | 1,636 | 0,759 | 0,352 | 0,164 | 0,142 | —     | —     | —     |
| 20 | 6,129 | 7,594  | 3,524 | 1,636 | 0,759 | 0,352 | 0,306 | —     | —     | —     | —     |
| 21 | 6,129 | 7,594  | 3,524 | 1,636 | 0,759 | 0,658 | —     | —     | —     | —     | —     |
| 22 | 6,129 | 7,594  | 3,524 | 1,636 | 1,417 | —     | —     | —     | —     | —     | —     |
| 23 | 6,129 | 7,594  | 3,524 | 3,053 | —     | —     | —     | —     | —     | —     | —     |
| 24 | 6,129 | 7,594  | 6,577 | —     | —     | —     | —     | —     | —     | —     | —     |
| 25 | 6,129 | 14,171 | —     | —     | —     | —     | —     | —     | —     | —     | —     |

Deuterium (D)

| i | $E_n$ | | $\Delta u$ | $\sigma_t$ | $\sigma_c$ | $\sigma_{in}$ | $\sigma_e$ | $\mu_e$ | $\xi$ | $\sigma_d(e)$ |
|---|---|---|---|---|---|---|---|---|---|---|
| 1  | 6,5–10,5   | MeV | 0,48 | 1,28 | 0,0000 | 0,11 | 1,17 | 0,46 | 0,59 | 0,80 |
| 2  | 4,0–6,5    | MeV | 0,48 | 1,70 | 0,0000 | 0,04 | 1,66 | 0,41 | 0,64 | 1,07 |
| 3  | 2,5–4,0    | MeV | 0,48 | 2,15 | 0,0000 | 0,00 | 2,15 | 0,33 | 0,73 | 1,50 |
| 4  | 1,4–2,5    | MeV | 0,57 | 2,60 | 0,0000 | —    | 2,60 | 0,29 | 0,77 | 1,85 |
| 5  | 0,8–1,4    | MeV | 0,57 | 2,90 | 0,0000 | —    | 2,90 | 0,26 | 0,80 | 2,23 |
| 6  | 0,4–0,8    | MeV | 0,69 | 3,10 | 0,0000 | —    | 3,10 | 0,25 | 0,82 | 2,33 |
| 7  | 0,2–0,4    | MeV | 0,69 | 3,20 | 0,0000 | —    | 3,20 | 0,26 | 0,80 | 2,41 |
| 8  | 0,1–0,2    | MeV | 0,69 | 3,30 | 0,0000 | —    | 3,30 | 0,27 | 0,79 | 2,44 |
| 9  | 46,5–100   | keV | 0,77 | 3,40 | 0,0000 | —    | 3,40 | 0,32 | 0,74 | 2,28 |
| 10 | 21,5–46,5  | keV | 0,77 | 3,40 | 0,0000 | —    | 3,40 | 0,33 | 0,72 | 2,23 |
| 11 | 10,0–21,5  | keV | 0,77 | 3,40 | 0,0000 | —    | 3,40 | 0,33 | 0,72 | 2,23 |
| 12 | 4,65–10,0  | keV | 0,77 | 3,40 | 0,0000 | —    | 3,40 | 0,33 | 0,72 | 2,23 |
| 13 | 2,15–4,65  | keV | 0,77 | 3,40 | 0,0000 | —    | 3,40 | 0,33 | 0,72 | 2,23 |
| 14 | 1,0–2,15   | keV | 0,77 | 3,40 | 0,0000 | —    | 3,40 | 0,33 | 0,72 | 2,23 |
| 15 | 465–10000  | eV  | 0,77 | 3,40 | 0,0000 | —    | 3,40 | 0,33 | 0,72 | 2,23 |
| 16 | 215–465    | eV  | 0,77 | 3,40 | 0,0000 | —    | 3,40 | 0,33 | 0,72 | 2,23 |
| 17 | 100–215    | eV  | 0,77 | 3,40 | 0,0000 | —    | 3,40 | 0,33 | 0,72 | 2,23 |
| 18 | 46,5–100   | eV  | 0,77 | 3,40 | 0,0000 | —    | 3,40 | 0,33 | 0,72 | 2,23 |
| 19 | 21,5–46,5  | eV  | 0,77 | 3,40 | 0,0000 | —    | 3,40 | 0,33 | 0,72 | 2,23 |
| 20 | 10,0–21,5  | eV  | 0,77 | 3,40 | 0,0000 | —    | 3,40 | 0,33 | 0,72 | 2,23 |

-continued

Deuterium (D)

| i | $E_n$ | | $\Delta u$ | $\sigma_t$ | $\sigma_c$ | $\sigma_{in}$ | $\sigma_e$ | $\mu_e$ | $\xi$ | $\sigma_d(e)$ |
|---|---|---|---|---|---|---|---|---|---|---|
| 21 | 4,65–10 | eV | 0,77 | 3,40 | 0,0000 | — | 3,40 | 0,33 | 0,72 | 2,23 |
| 22 | 2,15–4,65 | eV | 0,77 | 3,40 | 0,0000 | — | 3,40 | 0,33 | 0,72 | 2,23 |
| 23 | 1,0–2,15 | eV | 0,77 | 3,40 | 0,0000 | — | 3,40 | 0,33 | 0,72 | 2,23 |
| 24 | 0,465–1,0 | eV | 0,77 | 3,40 | 0,0001 | — | 3,40 | 0,33 | 0,72 | 2,23 |
| 25 | 0,215–0,465 | eV | 0,77 | 3,40 | 0,0002 | — | 3,40 | 0,33 | 0,72 | 2,23 |
| T | 0,0252 | eV | — | 3,40 | 0,0006 | — | 3,40 | 0,33 | — | — |

| | $\sigma_e$ (i,i+k) at k equal to | | | | |
|---|---|---|---|---|---|
| i | 0 | 1 | 2 | 3 | 4 |
| 1 | 0,37 | 0,45 | 0,10 | 0,11 | 0,14 |
| 2 | 0,59 | 0,55 | 0,17 | 0,19 | 0,16 |
| 3 | 0,65 | 0,65 | 0,33 | 0,44 | 0,08 |
| 4 | 0,75 | 0,72 | 0,62 | 0,48 | 0,03 |
| 5 | 0,67 | 1,05 | 0,77 | 0,40 | 0,01 |
| 6 | 0,77 | 1,22 | 0,78 | 0,33 | 0,00 |
| 7 | 0,84 | 1,29 | 0,80 | 0,27 | — |
| 8 | 0,86 | 1,43 | 0,81 | 0,20 | — |
| 9 | 1,12 | 1,43 | 0,69 | 0,16 | — |
| 10 | 1,16 | 1,43 | 0,67 | 0,14 | — |
| 11 | 1,16 | 1,43 | 0,67 | 0,14 | — |
| 12 | 1,16 | 1,43 | 0,67 | 0,14 | — |
| 13 | 1,16 | 1,43 | 0,67 | 0,14 | — |
| 14 | 1,16 | 1,43 | 0,67 | 0,14 | — |
| 15 | 1,16 | 1,43 | 0,67 | 0,14 | — |
| 16 | 1,16 | 1,43 | 0,67 | 0,14 | — |
| 17 | 1,16 | 1,43 | 0,67 | 0,14 | — |

-continued

| | $\sigma_e$ (i,i+k) at k equal to | | | | |
|---|---|---|---|---|---|
| i | 0 | 1 | 2 | 3 | 4 |
| 18 | 1,16 | 1,43 | 0,67 | 0,14 | — |
| 19 | 1,16 | 1,43 | 0,67 | 0,14 | — |
| 20 | 1,16 | 1,43 | 0,67 | 0,14 | — |
| 21 | 1,16 | 1,43 | 0,67 | 0,14 | — |
| 22 | 1,16 | 1,43 | 0,67 | 0,14 | — |
| 23 | 1,16 | 1,43 | 0,67 | 0,14 | — |
| 24 | 1,16 | 1,43 | 0,80 | — | — |
| 25 | 1,16 | 2,24 | — | — | — |

| | $\sigma_{in}$ (i,i+k) at k equal to | | | | | | |
|---|---|---|---|---|---|---|---|
| i | 0 | 1 | 2 | 3 | 4 | 5 | 6 |
| 1 | 0,00 | 0,02 | 0,06 | 0,06 | 0,04 | 0,03 | 0,01 |
| 2 | 0,00 | 0,00 | 0,02 | 0,03 | 0,02 | 0,01 | — |

| | $\mu_{in}$ (i,i+k) at k equal to | | | | | | |
|---|---|---|---|---|---|---|---|
| i | 0 | 1 | 2 | 3 | 4 | 5 | 6 |
| 1 | — | 0,85 | 0,75 | 0,65 | 0,55 | 0,40 | 0,40 |
| 2 | — | — | 0,80 | 0,70 | 0,60 | 0,50 | — |

Lead (Pb)

| i | $E_n$ | $\Delta u$ | $\sigma_t$ | $\sigma_c$ | $\sigma_{in}$ | $\sigma_e$ | $\mu_e$ | $\xi$ | $\sigma_d(e)$ |
|---|---|---|---|---|---|---|---|---|---|
| 1 | 6,5–10,5 MeV | 0,48 | 5,50 | 0,000 | 2,50 | 3,00 | 0,84 | 0,0015 | 0,023 |
| 2 | 4,0–6,5 MeV | 0,48 | 7,20 | 0,000 | 2,10 | 5,10 | 0,76 | 0,0023 | 0,040 |
| 3 | 2,5–4,0 MeV | 0,48 | 7,50 | 0,001 | 1,23 | 6,27 | 0,52 | 0,0046 | 0,071 |
| 4 | 1,4–2,5 MeV | 0,57 | 5,90 | 0,001 | 0,55 | 5,35 | 0,31 | 0,0066 | 0,062 |
| 5 | 0,8–1,4 MeV | 0,57 | 5,70 | 0,003 | 0,29 | 5,41 | 0,20 | 0,0077 | 0,073 |
| 6 | 0,4–0,8 MeV | 0,69 | 5,70 | 0,004 | 0,01 | 5,69 | 0,13 | 0,0084 | 0,069 |
| 7 | 0,2–0,4 MeV | 0,69 | 7,40 | 0,006 | — | 7,39 | 0,14 | 0,0083 | 0,089 |
| 8 | 0,1–0,2 MeV | 0,69 | 9,80 | 0,006 | — | 9,79 | 0,10 | 0,0086 | 0,122 |
| 9 | 46,5–100 keV | 0,77 | 10,7 | 0,005 | — | 10,7 | 0,05 | 0,0091 | 0,126 |
| 10 | 21,5–46,5 KeV | 0,77 | 10,2 | 0,001 | — | 10,2 | 0,02 | 0,0094 | 0,125 |
| 11 | 10,0–21,5 keV | 0,77 | 10,7 | 0,002 | — | 10,7 | 0,01 | 0,0095 | 0,132 |
| 12 | 4,65–10,0 keV | 0,77 | 11,0 | 0,001 | — | 11,0 | 0,00 | 0,0096 | 0,137 |
| 13 | 2,15–4,65 keV | 0,77 | 11,0 | 0,001 | — | 11,0 | 0,00 | 0,0096 | 0,137 |
| 14 | 1,0–2,15 keV | 0,77 | 11,0 | 0,001 | — | 11,0 | 0,00 | 0,0096 | 0,138 |
| 15 | 465–1000 eV | 0,77 | 11,1 | 0,001 | — | 11,1 | 0,00 | 0,0096 | 0,138 |
| 16 | 215–465 eV | 0,77 | 11,2 | 0,002 | — | 11,2 | 0,00 | 0,0096 | 0,140 |
| 17 | 100–215 eV | 0,77 | 11,3 | 0,002 | — | 11,3 | 0,00 | 0,0096 | 0,141 |
| 18 | 46,5–100 eV | 0,77 | 11,3 | 0,003 | — | 11,3 | 0,00 | 0,0096 | 0,141 |
| 19 | 21,5–46,5 eV | 0,77 | 11,3 | 0,005 | — | 11,3 | 0,00 | 0,0096 | 0,141 |
| 20 | 10,0–21,5 eV | 0,77 | 11,3 | 0,007 | — | 11,3 | 0,00 | 0,0096 | 0,141 |
| 21 | 4,65–10,0 eV | 0,77 | 11,3 | 0,010 | — | 11,3 | 0,00 | 0,0096 | 0,141 |
| 22 | 2,15–4,65 eV | 0,77 | 11,3 | 0,015 | — | 11,3 | 0,00 | 0,0096 | 0,141 |
| 23 | 1,0–2,15 eV | 0,77 | 11,3 | 0,022 | — | 11,3 | 0,00 | 0,0096 | 0,141 |
| 24 | 0,465–1,0 eV | 0,77 | 11,3 | 0,033 | — | 11,3 | 0,00 | 0,0096 | 0,141 |
| 25 | 0,215–0,465 eV | 0,77 | 11,3 | 0,048 | — | 11,3 | 0,00 | 0,0096 | 0,141 |
| T | 0,0252 eV | | 11,5 | 0,170 | — | 11,3 | 0,00 | 0,0096 | 0,141 |

| | $\sigma_{in}$ (i,i+k) at k equal to | | | | | | | | |
|---|---|---|---|---|---|---|---|---|---|
| i | 0 | 1 | 2 | 3 | 4 | 5 | 6 | 7 | 8 |
| | 0,01 | 0,09 | 0,35 | 0,83 | 0,78 | 0,55 | 0,20 | 0,07 | 0,02 |
| | 0,06 | 0,26 | 0,61 | 0,55 | 0,40 | 0,15 | 0,05 | 0,02 | — |
| | 0,21 | 0,35 | 0,27 | 0,24 | 0,11 | 0,04 | 0,01 | — | — |
| | 0,15 | 0,26 | 0,10 | 0,04 | — | — | — | — | — |
| | 0,00 | 0,13 | 0,11 | 0,04 | 0,01 | — | — | — | — |
| | 0,00 | 0,00 | 0,00 | 0,01 | — | — | — | — | — |

Bismuth (Bi)

| i | $E_n$ | $\Delta u$ | $\sigma_t$ | $\sigma_c$ | $\sigma_{in}$ | $\sigma_e$ | $\mu_e$ | $\xi$ | $\sigma_d(e)$ |
|---|---|---|---|---|---|---|---|---|---|
| 1 | 6,5–10,5 MeV | 0,48 | 5,30 | 0,001 | 2,50 | 2,80 | 0,82 | 0,0017 | 0,024 |
| 2 | 4,0–6,5 MeV | 0,48 | 7,20 | 0,001 | 2,15 | 5,05 | 0,72 | 0,0027 | 0,046 |
| 3 | 2,5–4,0 MeV | 0,48 | 7,40 | 0,0015 | 1,25 | 6,15 | 0,50 | 0,0048 | 0,073 |
| 4 | 1,4–2,5 MeV | 0,57 | 6,00 | 0,002 | 0,53 | 5,47 | 0,31 | 0,0066 | 0,063 |
| 5 | 0,8–1,4 MeV | 0,57 | 5,00 | 0,0025 | 0,10 | 4,90 | 0,21 | 0,0075 | 0,064 |
| 6 | 0,4–0,8 MeV | 0,69 | 6,00 | 0,0025 | 0,00 | 6,00 | 0,14 | 0,0082 | 0,071 |
| 7 | 0,2–0,4 MeV | 0,69 | 7,50 | 0,0025 | — | 7,50 | 0,10 | 0,0086 | 0,093 |
| 8 | 0,1–0,2 MeV | 0,69 | 9,00 | 0,0025 | — | 9,00 | 0,07 | 0,0088 | 0,115 |
| 9 | 46,5–100 keV | 0,77 | 10,0 | 0,002 | — | 10,0 | 0,05 | 0,0090 | 0,117 |
| 10 | 21,5–46,5 keV | 0,77 | 11,5 | 0,002 | — | 11,5 | 0,02 | 0,0093 | 0,139 |
| 11 | 10,0–21,5 keV | 0,77 | 16,0 | 0,002 | — | 16,0 | 0,00 | 0,0095 | 0,197 |
| 12 | 4,65–10,0 keV | 0,77 | 9,5 | 0,005 | — | 9,5 | 0,00 | 0,0095 | 0,117 |

-continued

| | | | | | | | | | |
|---|---|---|---|---|---|---|---|---|---|
| 13 | 2,15–4,65 keV | 0,77 | 17,5 | 0,023 | — | 17,5 | 0,00 | 0,0095 | 0,216 |
| 14 | 1,0–2,15 keV | 0,77 | 9,5 | 0,0015 | — | 9,5 | 0,00 | 0,0095 | 0,117 |
| 15 | 465–1000 eV | 0,77 | 220 | 0,190 | — | 220 | 0,00 | 0,0095 | 2,71 |
| 16 | 215–465 eV | 0,77 | 8,80 | 0,0007 | — | 8,80 | 0,00 | 0,0095 | 0,109 |
| 17 | 100–215 eV | 0,77 | 9,00 | 0,0006 | — | 9,00 | 0,00 | 0,0095 | 0,111 |
| 18 | 46,5–100 eV | 0,77 | 9,00 | 0,0007 | — | 9,00 | 0,00 | 0,0095 | 0,111 |
| 19 | 21,5–46,5 eV | 0,77 | 9,00 | 0,0010 | — | 9,00 | 0,00 | 0,0095 | 0,111 |
| 20 | 10,0–21,5 eV | 0,77 | 9,00 | 0,0014 | — | 9,00 | 0,00 | 0,0095 | 0,111 |
| 21 | 4,65–10,0 eV | 0,77 | 9,00 | 0,0021 | — | 9,00 | 0,00 | 0,0095 | 0,111 |
| 22 | 2,15–4,65 eV | 0,77 | 9,00 | 0,0030 | — | 9,00 | 0,00 | 0,0095 | 0,111 |
| 23 | 1,0–2,15 eV | 0,77 | 9,00 | 0,0044 | — | 9,00 | 0,00 | 0,0095 | 0,111 |
| 24 | 0,465–1,0 eV | 0,77 | 9,01 | 0,0065 | — | 9,00 | 0,00 | 0,0095 | 0,111 |
| 25 | 0,215–0,465 eV | 0,77 | 9,01 | 0,0095 | — | 9,00 | 0,00 | 0,0095 | 0,111 |
| T | 0,0252 eV | — | 9,03 | 0,034 | — | 9,00 | 0,00 | — | — |

| | $\sigma_{in}(i,i+k)$ at $k$ equal to | | | | | | | | |
|---|---|---|---|---|---|---|---|---|---|
| i | 0 | 1 | 2 | 3 | 4 | 5 | 6 | 7 | 8 |
| 1 | 0,00 | 0,05 | 0,25 | 0,75 | 0,84 | 0,66 | 0,26 | 0,10 | 0,03 |
| 2 | 0,04 | 0,24 | 0,60 | 0,60 | 0,43 | 0,18 | 0,05 | 0,01 | — |
| 3 | 0,10 | 0,74 | 0,18 | 0,14 | 0,06 | 0,02 | 0,01 | — | — |
| 4 | 0,08 | 0,24 | 0,17 | 0,03 | 0,01 | — | — | — | — |
| 5 | 0,00 | 0,06 | 0,03 | 0,01 | — | — | — | — | — |

The thermal capture cross section of lead is about half that of hydrogen. That of bismuth is even less. On the other hand bismuth has an appreciable resonance capture which is lacking in lead. In both lead and bismuth the captures are at least partly offset by the (n,2n) reaction.

Specific embodiments of this invention will be described below in which the above cited characteristics of lead and bismuth are used to advantage. While lead and bismuth have similar high energy properties, the use of lead is generally preferable since it is more available. Where the melting point of lead (327° C.) is objectionable, PbO (888° C. melting point) with nearly the same nuclear characteristics can be used. The melting point of PbO should be adequate since very little heating of lead rods will occur in a reactor. Similarly for bismuth the oxide form $Bi_2O_3$ (820° C. melting point) can be used.

Very little cladding should be necessary because of the nonchemically reactive nature of both lead and bismuth. An objection to bismuth is its scarcity. However, these heavy elements can be reused indefinitely. Bismuth results in formation of highly toxic polonium-210, but the clad oxide should prevent difficulty. Nuclearly, lead is preferable in very hard spectra, while bismuth is more advantageous in regions of thermal spectra. In most cases, the differences in nuclear effects between the two materials are not very great.

SUMMARY OF THE INVENTION

It is a general object of the invention to achieve reactivity increases in thermal and epithermal reactors, by use of heavy elements, particularly lead and bismuth, in place of the moderator in selected locations of the reactors. These increases can then be exploited advantageously, for example, to reduce water needs in the case of heavy water moderated reactors and of enrichment needs in the case of light water reactors. The very high cost of heavy water has prevented heavy water natural uranium reactors from being economically competitive. The cost of enrichment and consequent inefficient use of uranium ores is a major factor in the fuel costs of light water reactors. Thus this invention can significantly reduce the costs of power from various types of widely used reactors.

Similar advantages of those outlined herein would also apply to reactors using other types of moderators, such as graphite or beryllium.

DESCRIPTION OF THE PREFERRED EMBODIMENTS

Figure 1:
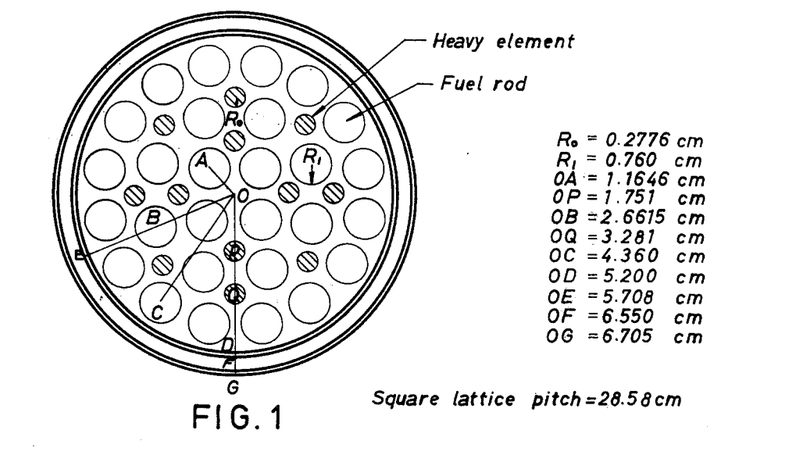
FIG. 1 is a cross-sectional view of the calandria of a Pickering-type heavy water reactor illustrating the insertion of rods of heavy elements in accordance with the present invention.

Note: Unless otherwise stated all calculations were done with the HWOCRSAFE Monte Carlo code using 20,000 neutron histories, and the latest available ENDF-B cross sections. In all comparison cases tried the reactivity results for 20,000 neutron histories were indistinguishable from those for 100,000 neutron histories.

a. FIG. 1 shows a cross section view of the calandria of the Pickering type heavy water reactor. The reactor is moderated and cooled by heavy water ($D_2O$ 99.75%). Each calandria contains 28 natural uranium oxide rods. A 28.58 cm. square lattice pitch is used. In the first case the reactivity was computed for the standard reactor design. In the second case twelve small lead rods were added in the interstices between the fuel rods, as shown, in locations which would not interfere with the cooling of the fuel. In case 3 the pitch was reduced in order to be able to estimate the savings of heavy water moderator.

| Case | No. of lead rods added | Square lattice pitch, cm. | $k_\infty$ |
|---|---|---|---|
| 1 | none | 28.58 | 1.109 |
| 2 | 12 rods, radius 0.2776 cm. | 28.58 | 1.118 |
| 3 | 12 rods, radius 0.2776 cm. | 27.50 | 1.104 |

By extrapolation of case 3 it is evident that when the lead is added the original reactivity would be obtained at a reduced pitch, resulting in a saving of moderator ($D_2O$) content of about 7%.

Figure 2:
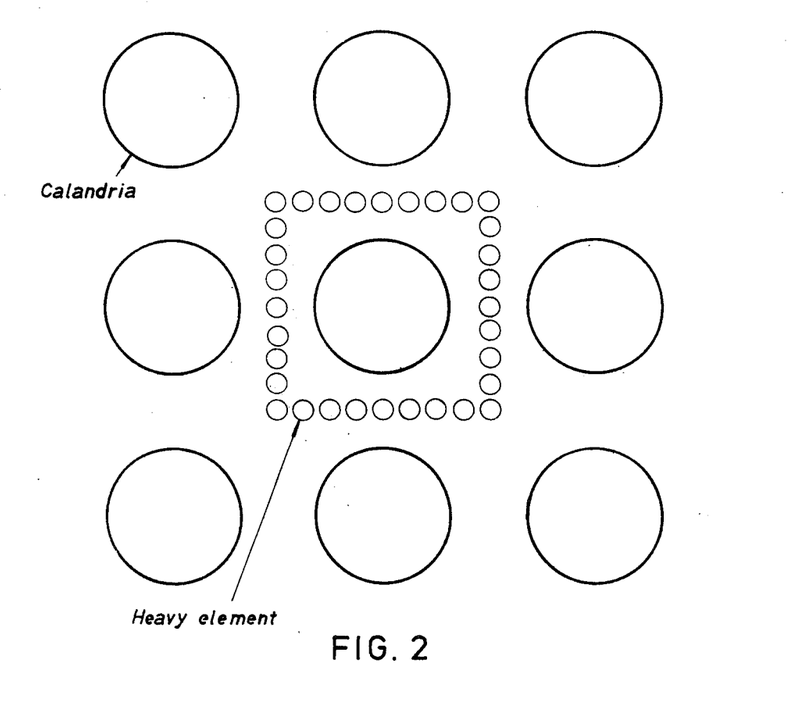
FIG. 2 is a schematic cross-sectional view illustrating the insertion of rods of heavy elements between calandria in accordance with the present invention.
Figure 3:
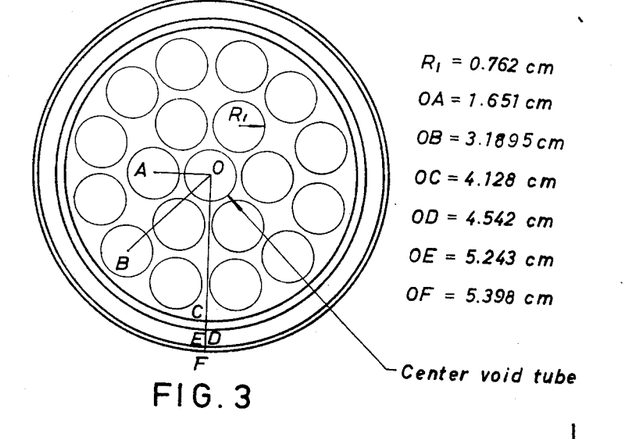
FIG. 3 is a cross-sectional view of the calandria of the Gentilly-type reactor.

Another calculation was performed to determine the effect of replacement of the central fuel rod by a lead rod in a Douglas Point Calandria (19 fuel rods). Reactivity decreased by about 0.8%. However, if the calandria were now enlarged slightly and the fuel rod inserted in the outer row, reactivity would increase by over 1.6%, resulting in a net increase of the order of 0.8%. This could permit a further significant decrease in the moderator ($D_2O$) content.

b. FIG. 2 depicts an embodiment of this invention for further potential savings in moderator ($D_2O$) content. In this case heavy element rods are located approximately midway between calandria. Consider a high energy neutron, originating in the central calandria in the figure, which collides with a heavy element rod and is slowed down. This neutron will now have a maximum path length through the $D_2O$ and, therefore, will be well moderated before it reaches the fuel elements. Had it not been for the heavy element rods, the neutron would not have started slowing down until it was near one of the neighboring calandria. Then its path through the moderator, before reaching a fuel element, would have been shorter, thermalization would be less likely, and capture probability by the U-238 resonances increased. Thus the heavy elements rods should result in an increase of reactivity, which could be exploited to reduce the amount of moderator. Since the spectrum of the area in which the heavy elements are placed is highly thermal, bismuth would probably be preferable for this application.

c. FIG. 3 shows a cross section view of the calandria of the Gentilly type reactors. This type of reactor is moderated by heavy water ($D_2O$ 99.75%), and the cooling in this case is assumed to be by light water ($H_2O$). Each calandria contains 18 natural uranium oxide rods. Case 1 is for a standard arrangement. Case 2 has the center void tube removed and replaced by lead.

| Case | Square lattice pitch, cm. | $k_\infty$ |
| --- | --- | --- |
| 1 | 27 | 1.073 |
| 2 Center void tube replaced by lead | 27 | 1.082 |

Figure 4:
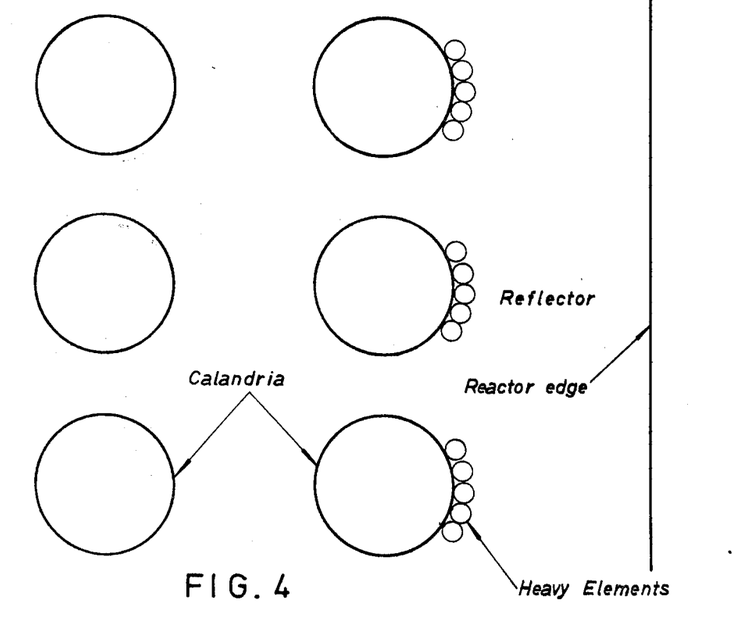
FIG. 4 is a schematic cross-sectional view of a heavy water-type reactor having a relatively narrow reflector illustrating the insertion of rods of heavy elements outside the calandria which border the reflector.

These cases were run with 10,000 neutron histories and a correction was included for the lead (n,2n) reaction. This indicates that the lead increases reactivity as compared with a central void. As in case a, above, the moderator could be reduced about 7%, maintaining reactivity constant. Further savings in heavy water could be obtained by insertion of small lead rods in fuel element interstices and by utilization of other embodiments as described in a. and b., above.

d. Another embodiment of this invention is to locate the heavy elements near or inside $D_2O$ reflectors in order to reduce the leakage of neutrons out of the reactor. For example, the CAN-DU reactors utilize a 60 cm. thick reflector. This large thickness is needed primarily to prevent leakage of the very high energy neutrons for which deuterium has a relatively small slowing down cross section. For thick reflectors the heavy elements would be located, similarly to the arrangement of FIG. 2, so that neutrons colliding with the heavy element would have a long path through the moderator, before reaching the fuel elements of the calandria, to ensure good moderation. For very narrow reflectors, FIG. 4 illustrates a feasible arrangement. It will be noted that the heavy elements would be located outside the calandria which border the reflector. In either case, by stopping the very high energy neutrons from escaping, considerable gain in reactivity can be obtained with corresponding savings in heavy water. For this purpose bismuth would be preferable because the thermal flux is relatively high in the location in which the heavy element is placed.

On the other hand in the case of the heavy water breeder reactor, as described in U.S. Pat. No. 3,859,165 of Jan. 7, 1975, Radkowsky et al., the spectrum is very hard and lead would be preferable.

e. Application to Light Water Reactors

In order to obtain an advantage from use of heavy elements in the interior of a uniformly enriched light water reactor it is necessary that the fuel elements be arranged in modules with part of the moderator on the outside of the fuel elements. Otherwise in an infinite lattice of the very small spacing typical of light water reactor cores the chance of the neutron being captured radiatively (i.e. without resulting in fission) is not appreciably affected by the presence of heavy elements.

In Boiling Water Reactors (BWR) the modular arrangement is already in use in order that when the water in contact with the fuel elements vaporizes there will be sufficient water for moderation. It is also feasible to employ such modular arrangements for Pressurized Water Reactors (PWR), since the water to fuel volume ratio is so high that there will be enough water in contact with the fuel elements to provide for cooling, even if some of the water is placed outside the module. The soluble poison, generally used for control of PWRs, will prevent excessive power peaking from the water outside the module.

Figure 5:
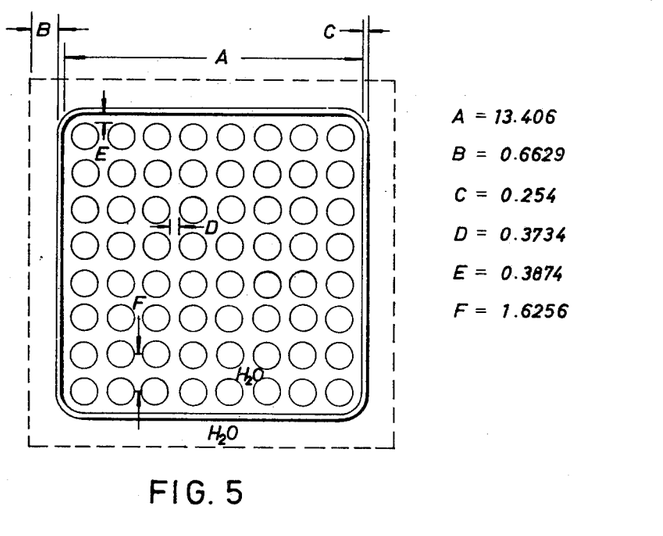
FIG. 5 is a typical fuel element module employed in a boiling water reactor.
Figure 6:
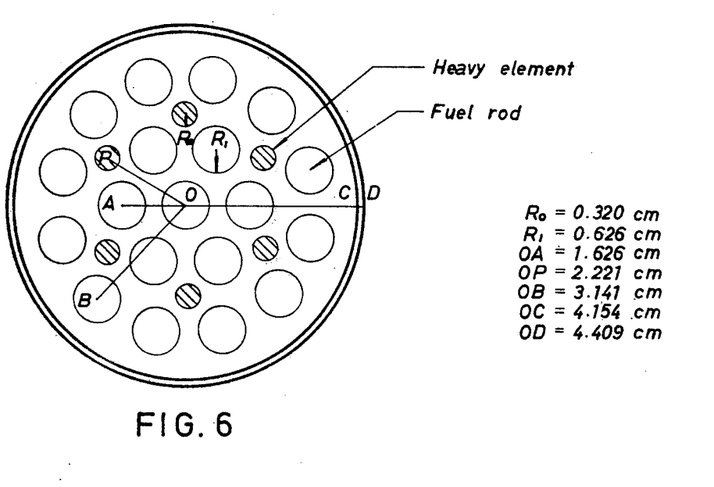
FIG. 6 is a representation of the module of FIG. 5 in a one-dimensional form suitable for employing the Monte Carlo code.

FIG. 5 shows a typical modular arrangement employed in BWRs and FIG. 6 is a representation of FIG. 5 in a one-dimensional form suitable for employing the Monte Carlo Code. The water density is typical of values in commercial BWRs at full power.

In the Table Case 1 gives the results without any lead and Cases 2 and 3 for the addition of 6 small lead rods in interstices where there will be minimum interference with cooling.

| Case | Number of lead rods added | Fuel enrichment (w/o) | Square lattice pitch cm. | $k_\infty$ |
| --- | --- | --- | --- | --- |
| 1 | 0 | 1.95 | 9.5 | 1.203 |
| 2 | 6 | 1.95 | 9.5 | 1.212 |
| 3 | 6 | 1.85 | 9.3 | 1.206 |

Case 3 indicates a significant savings in enrichment without loss of reactivity through use of lead rods within the fuel module. Further, the resonance escape probability has been reduced and the thermal utilization increased, which means that the conversion ratio is improved and, therefore, for the same lifetime a still smaller enrichment could be used.

f. In another embodiment it is found that an advantageous location for the heavy element is midway between fuel modules. Neutrons slowed down by the heavy elements then must traverse sufficient water to have a high probability of thermalization. This is ensured by the midway location of the heavy elements, provided that the width of the water channel remaining between modules is not exceesive so that too many neutrons are captured by the hydrogen. There is an optimum amount of heavy element and water for a channel. If the width of heavy element is increased, the slowing down effect tends to saturate, while the parasitic capture of the heavy element increases. Too little water will provide insufficient thermalization, - too much, as previously stated, will result in too great capture of neutrons by the hydrogen.

Figure 7:
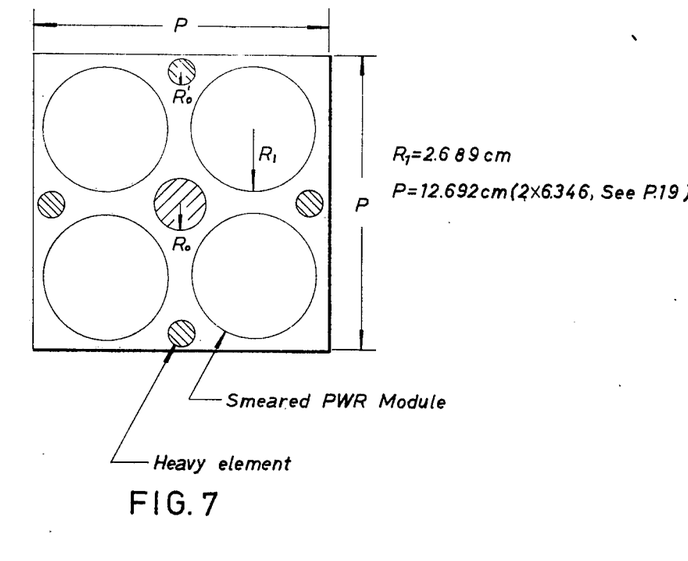
FIG. 7 is a representation of a pressurized water reactor illustrating the insertion of rods of heavy elements in accordance with the present invention.
Figure 8:
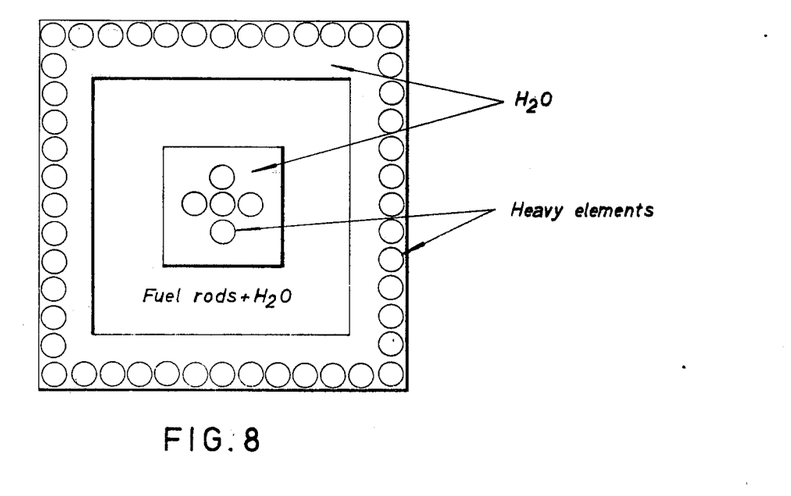
FIG. 8 is a representation of another modification of a pressurized water reactor illustrating the insertion of rods of heavy elements in accordance with the present invention.
Figure 9:
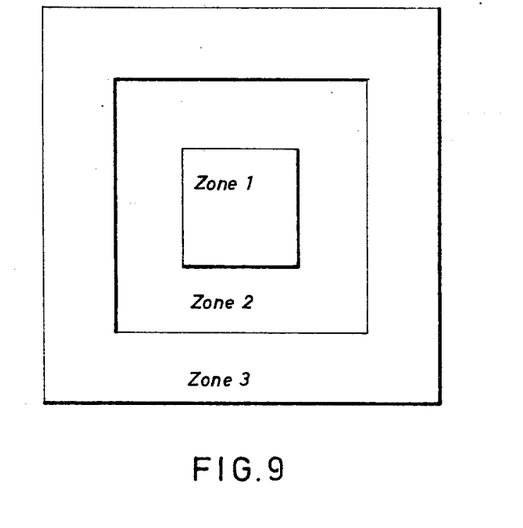
FIG. 9 is a schematic cross-sectional view of a light water-type reactor.

A typical PWR, as designed by Westinghouse, was studied. With 3% fuel enrichment the design water to fuel volume ratio of 2.8/1 is close to the optimum from a reactivity standpoint at the water density for operating temperatures. A module was selected consisting of 19 fuel rods which with normal rod spacing would occupy a 6.346 cm. square. A first Monte Carlo calculation was performed to show that the value of Koo was nearly unchanged if the fuel rods were placed closer together, equivalent to a 1/1 volume of water to fuel ratio, with the remaining water on the outside of the fuel region. Since the code was one-dimensional, the fuel region was taken as a circle of equivalent area. For the subsequent calculations it was necessary to assume the fuel, water, and zirconium smeared out uniformly within the circular fuel region. The values of Koo were calculated without and with lead added in interstitial locations as shown in FIG. 7. Without lead the value of Koo was 1.329. With lead rods having values of Ro=0.466 cm and R'o=0.330cm, the value of Koo was calculated to increase to 1.337. Further increase in reactivity could probably be obtained by adding lead at other points along the centerlines between modules and by using bismuth instead of lead, since the spectrum in these locations should be quite thermal. Thus a substantial saving of enrichment could be obtained for a given endurance, which is determined essentially by the initial value of Koo. Further gains may be obtained by the arrangement shown in FIG. 8.

g. Another embodiment of this invention for light water reactors is, similarly to heavy water reactors, to minimize loss of neutrons by leakage. Neutron leakage tends to be accentuated in light water reactors because in typical fuel management schemes the fresh fuel (of highest reactivity) is added on the outside of the core, while the more depleted fuel is moved towards the center. As in the heavy water case the optimum location of the heavy elements depends upon the size of the reflector. For a thick light water reflector the optimum location of the heavy elements would be in the reflector at a sufficient distance from the fuel elements that the neutrons slowed down by the heavy elements would have a good probability of thermalization, but not so far away that too many of these neutrons would be captured by the hydrogen. For narrow reflectors the heavy elements would be at least partly located in the outer fuel region of the core zone 3, as shown in FIG. 9. Such a location would be especially advantageous near the boundary between the fresh and depleted fuel regions, so as to minimize leakage from the high Koo to the low Koo regions. FIG. 9 shows a typical schematic arrangement.

h. Still another embodiment of this invention for light water reactors is in a seed/blanket core, which was used for the first two PWR cores installed in Shippingport, Pa. In this type of core the seed is made up of highly enriched fuel and the blanket contains natural uranium or low enrichment fuel. A major design objective is to generate as much energy in the blanket as possible. The loss of fast neutrons due to leakage from the blanket substantially reduces the fraction of power obtainable from the blanket. By employing some heavy elements in the blanket, the leakage of fast neutrons from the blanket could be reduced, and the fraction of total power obtainable from the blanket increased. This would make the economics of this core type much more attractive.

Figure 10:
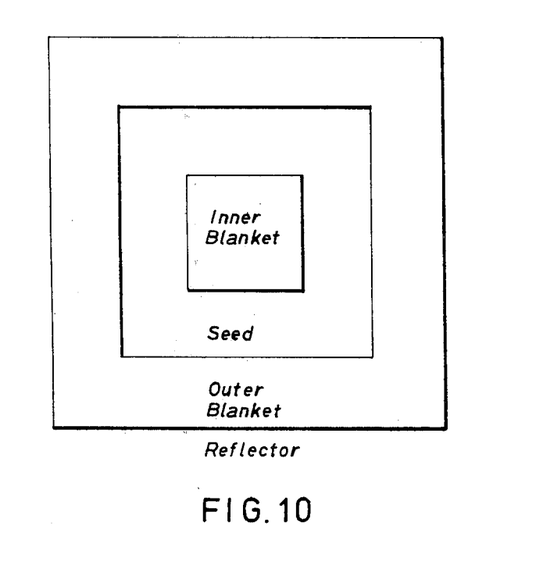
FIG. 10 is a schematic cross-sectional view of a seed/blanket core of a light water reactor.

FIG. 10 shows a typical schematic arrangement. Bismuth would probably be preferable for this application because of the thermal spectrum and low enrichment of the blanket.

What we claim is:

1. In a heavy water moderated reactor in which rods of nuclear fuel are arranged in a plurality of fuel bundles, the improvement which comprises inserting at least one rod of a heavy element having high inelastic cross section for high energy neutrons having energies above 1 MEV and low capture cross sections, said heavy element being selected from the group consisting of lead, bismuth, compounds and mixtures thereof into the said reactor positioned to obtain reactivity increases whereby the amount of heavy water in the said heavy water moderated reactor can be reduced without substantially detrimentally affecting the reactivity of the reactor.

2. In the invention of claim 1 wherein the heavy element is lead in either natural or oxide form.

3. In the invention of claim 1 wherein the heavy element is bismuth in either natural or oxide form.

4. In the invention of claim 1 wherein the rods of heavy element are disposed about at least part of the periphery of each fuel bundle.

5. In the invention of claim 1 wherein the rods of heavy element are interspersed within each fuel bundle.

6. In the invention of claim 5 wherein the fuel bundle includes a central rod and the central rod is composed of said heavy element.

7. In the invention of claim 6 wherein the heavy element is lead in either natural or oxide form.

8. In the invention of claim 1 wherein the rods of heavy element are disposed between adjacent fuel bundles.

9. In the invention of claim 8 wherein said heavy element is bismuth in natural or oxide form.

10. In the invention of claim 8 wherein said bismuth rods are disposed about the periphery of the fuel bundles.

11. In a heavy water moderated nuclear reactor containing a plurality of calandria containing a plurality of fuel elements, the improvement which comprises inserting at least one rod of a heavy element having high inelastic cross section for high energy neutrons having energies above 1 MEV and low capture cross sections, said heavy element being selected from the group consisting of lead, bismuth, compounds and mixtures thereof into the said reactor positioned to obtain reactivity increases whereby the amount of moderator in said reactor is reduced or the thickness of the reflector is reduced without substantially detrimentally affecting the reactivity of the reactor.

12. In the heavy water moderator nuclear reactor of claim 11 wherein each calandria includes a central rod which normally does not contain fuel, the further improvement wherein said central unfueled rod is replaced by a rod comprising lead.

13. In the heavy water moderated nuclear reactor of claim 11 wherein the heavy element is disposed between adjacent calandria or between the calandria and a reflector.

14. In the heavy water moderated nuclear reactor of claim 13 wherein the heavy element is bismuth in either natural or oxide form.

15. In a light water moderated nuclear reactor containing a plurality of fuel element containing a plurality of fuel rods, each fuel rod containing an enriched nuclear fuel, the improvement which comprises inserting at least one rod of a heavy element having high inelastic cross section for high energy neutrons having energies above 1 MEV and low capture cross sections, said heavy element being selected from the group consisting of lead, bismuth, compounds and mixtures thereof into said reactor positioned to obtain reacitivity increases whereby the degree of enrichment of fuel in the said fuel rod can be reduced without substantially detrimentally affecting the reactivity of the reactor.

16. In the invention of claim 15 wherein the heavy element is lead in either natural or oxide form.

17. In the invention of claim 15 wherein the heavy element is bismuth in either natural or oxide form.

18. In the invention of claim 15 wherein the rods of heavy element are disposed about at least part of the periphery of each fuel bundle.

19. In the light water moderated nuclear reactor of claim 15 wherein the rod of heavy element is disposed within the said module.

20. In the light water moderated nuclear reactor of claim 19 wherein each module is composed of an inner portion of heavy element rods disposed in light water, a first outer portion of fuel rods disposed in light water about the said inner portion and a second outer portion of heavy element rods disposed in light water about the said first outer portion.

21. In the light water moderated nuclear reactor of claim 15 wherein the reactor contains a core composed of a seed portion and a blanket portion and the rods of heavy element are disposed in the blanket portion.

22. In the light moderated nuclear reactor of claim 21 wherein the heavy element is bismuth in either natural or oxide form.

23. In the invention of claim 15 wherein the rods of heavy element are interspersed within each fuel bundle.

24. In the invention of claim 23 wherein the fuel bundle includes a central rod and the central rod is composed of said heavy element.

25. In the invention of claim 24 wherein the heavy element is lead in either natural or oxide form.

26. In the invention of claim 15 wherein the rods of heavy element are disposed between adjacent fuel bundles.

27. In the invention of claim 26 wherein said heavy element is busmuth in natural or oxide form.

28. In the invention of claim 26 wherein said bismuth rods are disposed about the periphery of the fuel bundles.

* * * * *

UNITED STATES PATENT AND TRADEMARK OFFICE
CERTIFICATE OF CORRECTION

PATENT NO. : 4,123,328
DATED : October 31, 1978
INVENTOR(S) : Alvin Radkowsky, Ji-Peng Chien, Chao-Yie Yang and Horng-Ming Hsieh It is certified that error appears in the above-identified patent and that said Letters Patent are hereby corrected as shown below:

Column 1, line 22 "Handbood" should be -- Handbook -- .
Column 2, line 58 "end" should be -- and -- .

Signed and Sealed this

Fifth Day of June 1979

[SEAL]

Attest:

RUTH C. MASON
Attesting Officer

DONALD W. BANNER
Commissioner of Patents and Trademarks